(12) United States Patent
Morimoto et al.

(10) Patent No.: US 11,188,762 B2
(45) Date of Patent: Nov. 30, 2021

(54) MOVING BODY RISK ASSESSMENT DEVICE, AND MOVING BODY MONITORING SYSTEM

(71) Applicants: Konica Minolta Inc., Tokyo (JP); CHIYODA CORPORATION, Kanagawa (JP)

(72) Inventors: Takashi Morimoto, Suita (JP); Motohiro Asano, Osaka (JP); Seiichi Tsuzuki, Takatsuki (JP); Hiroaki Suzuki, Kawasaki (JP); Teruo Hioki, Yokohama (JP); Hideaki Hotta, Higashiyamato (JP); Akifumi Toki, Chigasaki (JP)

(73) Assignees: Konica Minolta, Inc., Tokyo (JP); CHIYODA CORPORATION, Kanagawa (JP)

( * ) Notice: Subject to any disclaimer, the term of this patent is extended or adjusted under 35 U.S.C. 154(b) by 19 days.

(21) Appl. No.: 16/611,425

(22) PCT Filed: Apr. 9, 2018

(86) PCT No.: PCT/JP2018/014955
§ 371 (c)(1),
(2) Date: Nov. 6, 2019

(87) PCT Pub. No.: WO2018/207527
PCT Pub. Date: Nov. 15, 2018

(65) Prior Publication Data
US 2020/0167572 A1  May 28, 2020

(30) Foreign Application Priority Data

May 10, 2017  (JP) .............................. JP2017-093583

(51) Int. Cl.
*G06K 9/00* (2006.01)
*G01N 21/00* (2006.01)
(Continued)

(52) U.S. Cl.
CPC ..... *G06K 9/00771* (2013.01); *G01N 21/3504* (2013.01); *G06T 7/20* (2013.01);
(Continued)

(58) Field of Classification Search
USPC ....... 382/100, 103, 106–107, 120, 123, 162, 382/168, 173, 181, 189, 199, 206, 220,
(Continued)

(56) References Cited

U.S. PATENT DOCUMENTS

2015/0323449 A1* 11/2015 Jones ................. G01N 21/3103
356/437
2016/0123741 A1*  5/2016 Mountain ................ H04N 5/44
701/533

(Continued)

FOREIGN PATENT DOCUMENTS

| JP | H07175992 A | 7/1995 |
| JP | 2004234061 A | 8/2004 |
| JP | 2006030214 A | 2/2006 |

OTHER PUBLICATIONS

International Search Report dated May 15, 2018 filed in PCT/JP2018/014955.
(Continued)

*Primary Examiner* — Seyed H Azarian
(74) *Attorney, Agent, or Firm* — Rankin, Hill & Clark LLP (57) ABSTRACT

There is provided a moving body risk assessment device including a moving body detection unit that detects presence or movement of a moving body within an imaging range on the basis of image information imaged in a wavelength
(Continued)

region different from a visible region, and a risk assessment unit that assesses a risk to the detected moving body from the image information and a result of the moving body detection obtained by the moving body detection unit.

11 Claims, 9 Drawing Sheets

(51) Int. Cl.
  *G01N 21/3504* (2014.01)
  *G06T 7/20* (2017.01)
  *G08B 21/12* (2006.01)
  *G08B 21/22* (2006.01)
(52) U.S. Cl.
  CPC ............. *G08B 21/12* (2013.01); *G08B 21/22* (2013.01); *G06T 2207/10016* (2013.01); *G06T 2207/10048* (2013.01); *G06T 2207/30196* (2013.01); *G06T 2207/30232* (2013.01)

(58) Field of Classification Search
  USPC ....... 382/224, 232, 254, 286–291, 305, 312; 701/533; 356/437
  See application file for complete search history.

(56) References Cited

U.S. PATENT DOCUMENTS

| | | | | |
|---|---|---|---|---|
| 2017/0284887 A1* | 10/2017 | Miranda | ............... | G06K 9/4661 |
| 2017/0284891 A1* | 10/2017 | Miranda | ................. | G01M 3/38 |
| 2019/0318598 A1* | 10/2019 | Aponte Luis | .......... | G08B 21/22 |
| 2020/0169945 A1* | 5/2020 | Crouthamel | ....... | G06K 7/10297 |

OTHER PUBLICATIONS

Written Opinion of the International Searching Authority dated May 15, 2018 filed in PCT/JP2018/014955.

* cited by examiner

MOVING BODY RISK ASSESSMENT DEVICE, AND MOVING BODY MONITORING SYSTEM

TECHNICAL FIELD

The present invention relates to a moving body risk assessment device and a moving body monitoring system, which relates to, for example, a moving body risk assessment device that assesses a risk of leaked gas to a moving body from image information obtained by an infrared imaging device, and a moving body monitoring system including the moving body risk assessment device.

BACKGROUND ART

In structures, such as gas plants, petrochemical plants, thermal power plants, and steel manufacturing facilities, a large amount of gas is handled during operation. In such facilities, there has been recognized the risk of gas leakage due to time-based deterioration of the facilities and operational errors. Since gas is normally transparent and odorless in many cases, large-scale leakage may occur without being noticed by nearby workers. In view of the above, a structure in which a large amount of gas is handled is equipped with a large number of gas detection devices using detection probes to minimize gas leakage before a serious accident occurs.

A gas detection device using a detection probe detects the presence of gas utilizing the fact that the electrical characteristics of the probe change when gas molecules contact the detection probe. Accordingly, even if gas leaks, the gas cannot be detected unless the gas molecules reach the detection probe. If the gas detection devices are densely disposed throughout the facility, it becomes possible to detect gas leakage at a stage where the gas leakage is relatively small. However, installation costs and maintenance costs are high. Furthermore, in the case where gas is blown by the wind or the like, a large number of disposed gas detection devices may issue alarms at the same time, whereby the true location of the gas leakage source may be made difficult to find out. In addition, in the case where the gas detection devices are disposed at low density, gas leakage cannot be detected until the scale of the gas leakage becomes large, thereby increasing the risk of an accident. In view of the above, it is difficult to quickly and accurately notify workers and vehicles present nearby of the danger based on the gas leakage.

Meanwhile, Patent Literature 1 and the like propose a method using an infrared imaging device as another method of detecting the presence of gas. The method makes use of light radiation primarily in the infrared region from the background (which is called black-body radiation radiated from any object) and light absorption properties of the gas in the infrared region. That is, the gas is visualized and detected using the fact that an amount of infrared rays made incident on the imaging device from the background changes due to the presence of the gas. According to this gas detection technique, a wide range of gas can be detected by a single detection device, whereby gas detection is made possible without multiple detection devices, and specification of the gas leakage location is also made possible using a method such as an image analysis.

CITATION LIST

Patent Literature

Patent Literature 1: JP 2006-30214 A

SUMMARY OF INVENTION

Technical Problem

As described in Patent Literature 1, if gas leakage is two-dimensionally visualized by an imaging device using infrared absorption by gas, it becomes possible to specify, on an imaging screen, the leakage location of the gas that a person cannot notice the presence thereof. However, in attempting to make the workers and vehicles be aware of the danger on the basis of a result of specification of the gas leakage location on the imaging screen, and to issue an alarm or to provide evacuation guidance, a surveillance person is required to keep monitoring the imaging results. Therefore, there is a problem that, when there are a large number of locations to be monitored, judgment by the surveillance person may be delayed and the danger of the accident may increase. In addition, since there is also a possibility that a moving body, such as a person and a vehicle, may move in a direction approaching the gas leakage source without knowing it, it is necessary to promptly know the risk of the environment in which the moving body is present.

The present invention has been conceived in view of such circumstances, and an object of the present invention is to provide a moving body risk assessment device and a moving body monitoring system capable of assessing a risk of environment in which a moving body is present.

Solution to Problem

In order to achieve the object mentioned above, a moving body risk assessment device according to the present invention includes:

a moving body detection unit that detects presence or movement of a moving body within an imaging range on the basis of image information imaged in a wavelength region different from a visible region; and a risk assessment unit that assesses a risk to the detected moving body from the image information and a result of the moving body detection obtained by the moving body detection unit.

A moving body monitoring system according to the present invention includes: the moving body risk assessment device according to the present invention further including an alarm level calculation unit that calculates an alarm level from a result of assessment performed by the risk assessment unit; and an output device that issues an alarm corresponding to the alarm level.

Advantageous Effects of Invention

According to the present invention, a moving body, such as a person present in an image, is detected on the basis of image information obtained by imaging invisible conditions dangerous to a human body, and a risk to the moving body is assessed, whereby the risk of the environment in which the moving body is present can be assessed. Therefore, personal damage can be reduced by taking measures based on the risk (e.g., providing appropriate evacuation guidance to workers and vehicles in the vicinity of the gas leakage point, etc.).

DESCRIPTION OF EMBODIMENTS

Hereinafter, a moving body risk assessment device, a moving body monitoring system, and the like in which the present invention is implemented will be described with reference to the accompanying drawings. Note that mutually the same parts or corresponding parts in respective embodiments and the like will be denoted by the same reference signs, and duplicate descriptions will be omitted as appropriate.

Figure 1:
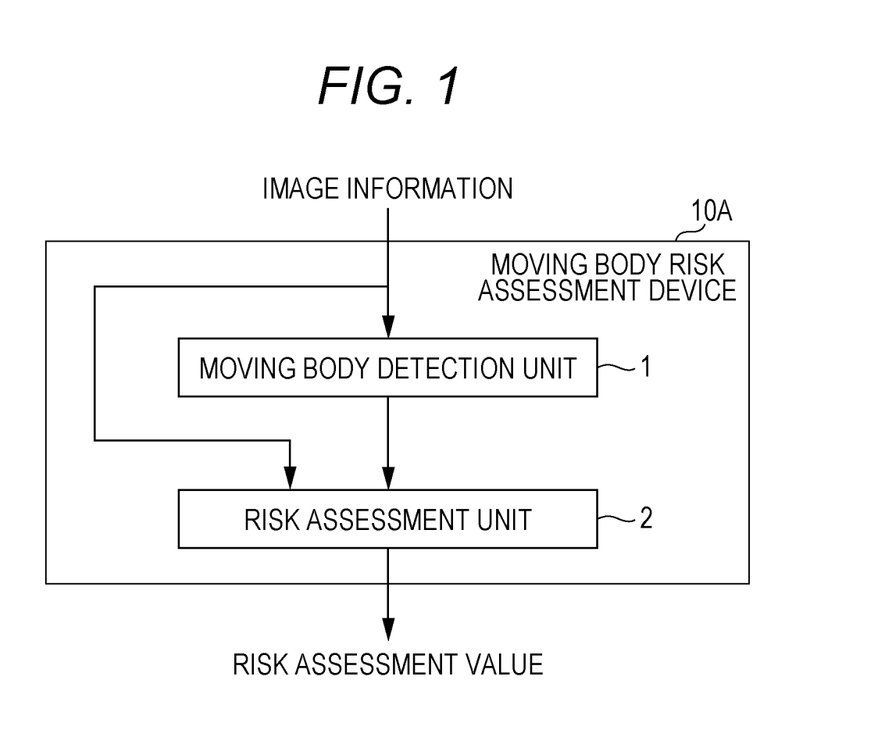
FIG. 1 is a block diagram illustrating a first embodiment of a moving body risk assessment device.
Figure 2:
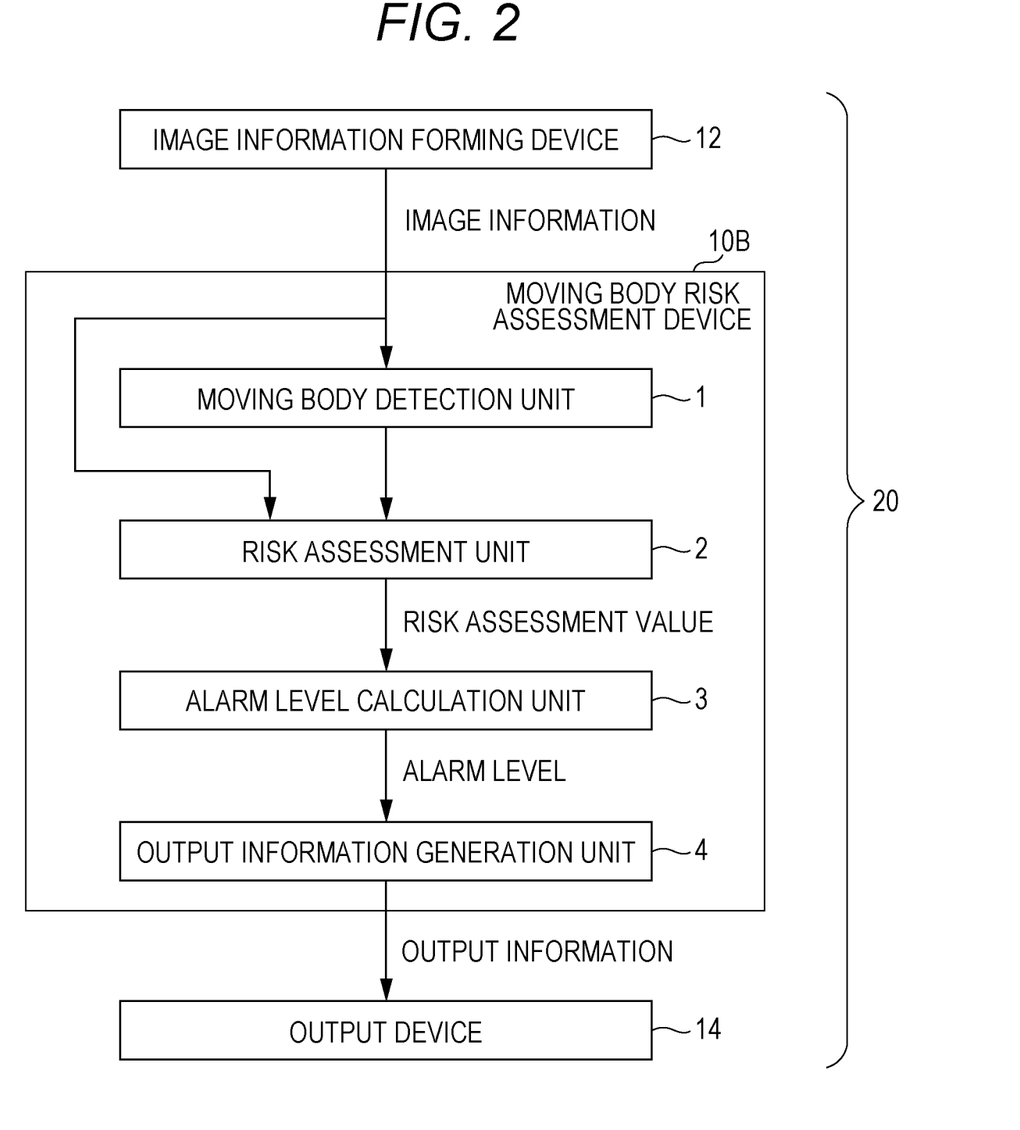
FIG. 2 is a block diagram illustrating a second embodiment of the moving body risk assessment device.

FIGS. 1 and 2 illustrate schematic configurations of moving body risk assessment devices 10A and 10B according to first and second embodiments. The moving body risk assessment devices 10A and 10B include a moving body detection unit 1 and a risk assessment unit 2 as functional blocks. The moving body detection unit 1 receives image information imaged in a wavelength region different from the visible region, and detects presence or movement of a moving body within the imaging range on the basis of the image information. The risk assessment unit 2 assesses a risk to the detected moving body from the image information and a result of the moving body detection obtained by the moving body detection unit 1. The moving body risk assessment device 10B further includes an alarm level calculation unit 3 and an output information generation unit 4 as functional blocks, and the moving body risk assessment device 10B, an image information forming device 12, and an output device 14 constitute a moving body monitoring system 20.

The moving body risk assessment devices 10A and 10B include, in digital equipment such as personal computers and mobile devices (smartphones, tablet terminals, etc.), a central processing unit (CPU), a random access memory (RAM), a read-only memory (ROM), a hard disk drive (HDD), and the like, which receive image information imaged in a wavelength region different from the visible region, and output a risk assessment value. The moving body detection unit 1 includes an electronic computer and image processing software, and the risk assessment unit 2 includes an electronic computer and signal processing software. That is, the CPU reads a moving body risk assessment processing program stored in the HDD, and loads and executes it in the RAM, thereby implementing the functional blocks.

Figure 3A:
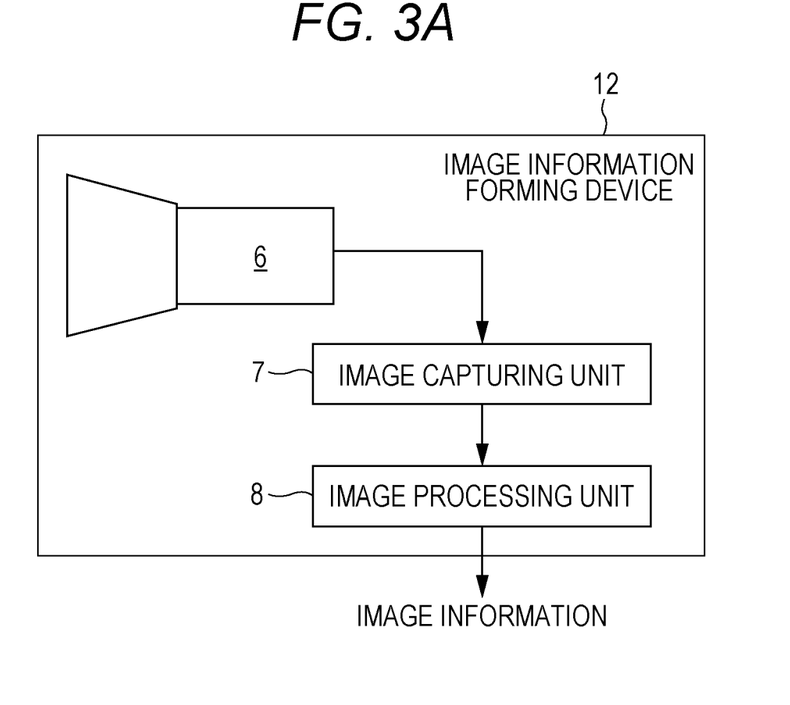
FIG. 3 is a block diagram illustrating an exemplary configuration of an image information forming device that forms image information according to the first and second embodiments.
Figure 3B:
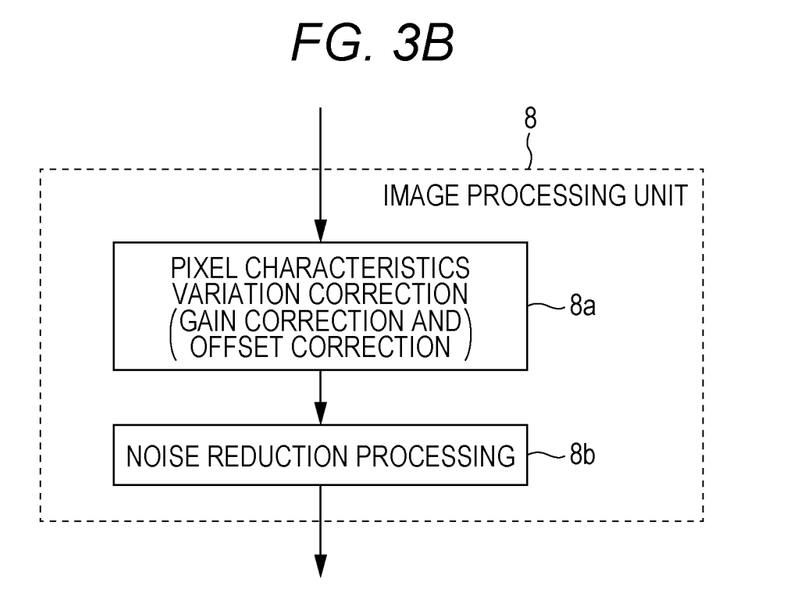

FIG. 3 illustrates an exemplary configuration of the image information forming device 12 that forms image information (input signals) for the moving body risk assessment devices 10A and 10B. As illustrated in FIG. 3A, the image information forming device 12 includes an imaging device 6 that images an object to be observed in a wavelength region different from the visible region, an image capturing unit 7 that retrieves moving image data output from the imaging device 6, and an image processing unit 8 that performs image processing on video data output from the image capturing unit 7. FIG. 3B illustrates an exemplary process performed by the image processing unit 8. The image processing unit 8 performs, as processing 8a, correction of variation in pixel characteristics (gain correction, offset correction, etc.) as necessary, and then performs, as processing 8b, processing of reducing noise as necessary.

An infrared region is preferable as a wavelength region different from the visible region. That is, image information to be input to the moving body detection unit 1 is preferably image information imaged in an infrared wavelength region. An object whose temperature is an absolute temperature of 0° C. or more generates an electromagnetic wave having a wavelength distribution and an intensity distribution corresponding to the temperature, and its light is called black-body radiation light. When the temperature is at around ordinary temperatures, the wavelength of the electromagnetic wave is mainly in the infrared region, whereby it becomes possible to know the temperature of the object by the infrared region being imaged. In addition, when gas is present, it partially absorbs the black-body radiation light emitted from the background corresponding to its light absorption properties, and emits black-body radiation light corresponding to the temperature of the gas itself. An amount of change with the black-body radiation light of the background in the absence of gas is captured as an image, whereby spatial distribution of the gas can be imaged. Therefore, the image information to be input to the moving body detection unit 1 is preferably image information obtained by imaging the spatial distribution of the gas present in the imaging range.

Figure 4A:
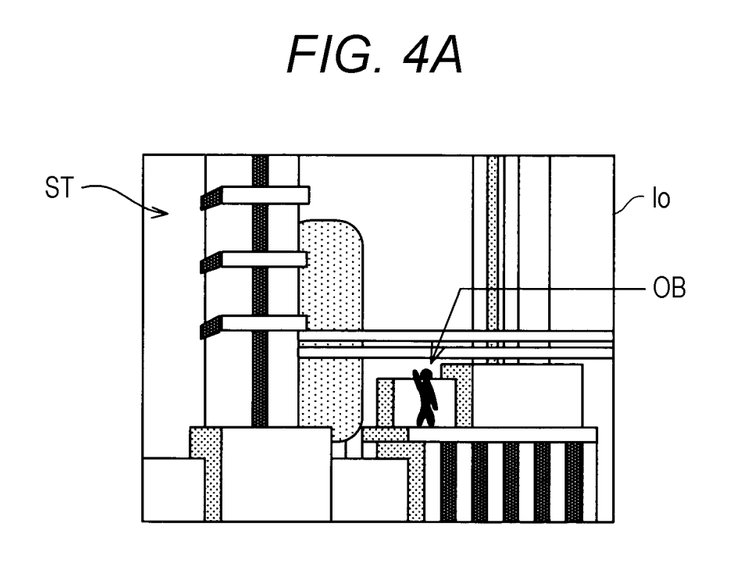
FIG. 4 is a schematic view illustrating imaging screens at a normal time and at a time of gas leakage.
Figure 4B:
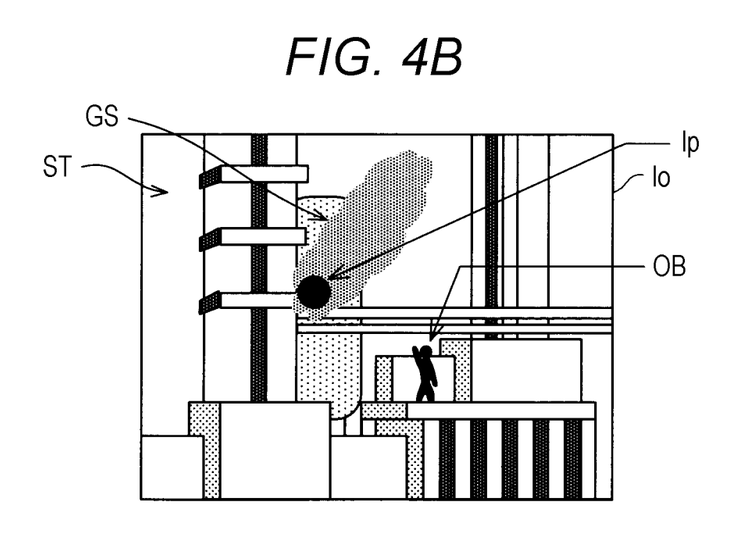

FIG. 4 schematically illustrates an imaging screen Io at a time of no gas leakage (normal time) and at a time of gas leakage. FIG. 4A illustrates the imaging screen Io when leaked gas GS is not present in the space, and FIG. 4B illustrates the imaging screen Io when the leaked gas GS is present in the space. A structure ST and a moving body OB (person, etc.) are imaged in the imaging screen Io in FIGS. 4A and 4B, and spatial distribution of the leaked gas GS is further imaged in the imaging screen Io in FIG. 4B. By performing image processing on temporal and spatial changes of the image of the leaked gas GS, it becomes possible to detect a gas leakage point Ip (black circle mark) that is a gas leakage source.

The imaging device 6 (e.g., infrared imaging device) includes, like a normal visible image pickup device, an imaging lens, a two-dimensional area sensor, a control circuit, and the like, which convers incident light into electric signals and outputs them. The difference from the visible image pickup device is a wavelength of light to be targeted, and a wavelength that includes a waveband to be absorbed by the gas to be detected is targeted. A preferable target wavelength is an infrared region of 1 to 14 µm, and a more preferable target wavelength is an infrared region of 1 to 5 µm. Since many hydrocarbon-based gases absorb those wavebands, they can cope with maw of the gases used by structures, such as gas plants, petrochemical plants, thermal power plants, and steel manufacturing facilities.

In order to deal with the wavebands, infrared ray transmitting materials, such as Si, Ge, chalcogenide, sapphire, ZnS, and ZnSe, are used as a lens material of the imaging lens, and an appropriate surface coating is applied to prevent light loss due to Fresnel reflection. What is called a cooled sensor or an uncooled sensor is used as a two-dimensional area sensor. The cooled sensor is made of a semiconductor material, such as InSb and MCT, and is configured to cool the sensor to suppress mixing of light radiation caused by heat of a sensor chip itself. The uncooled sensor is made of a thermal resistance conversion material such as $VO_2$ and a-Si.

Figure 5:
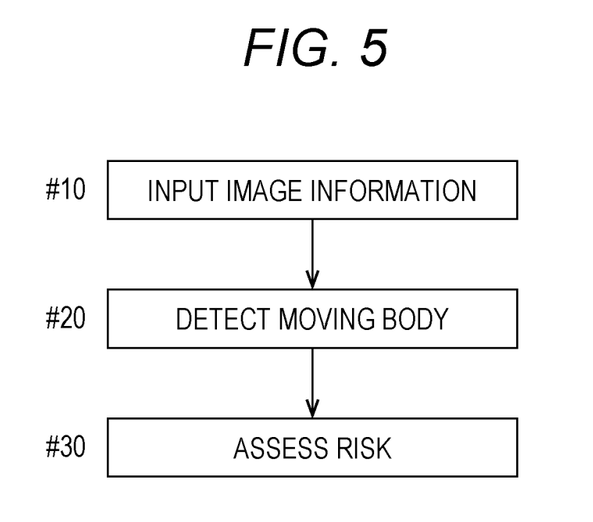
FIG. 5 is a flowchart illustrating an entire process according to the first embodiment.
Figure 6:
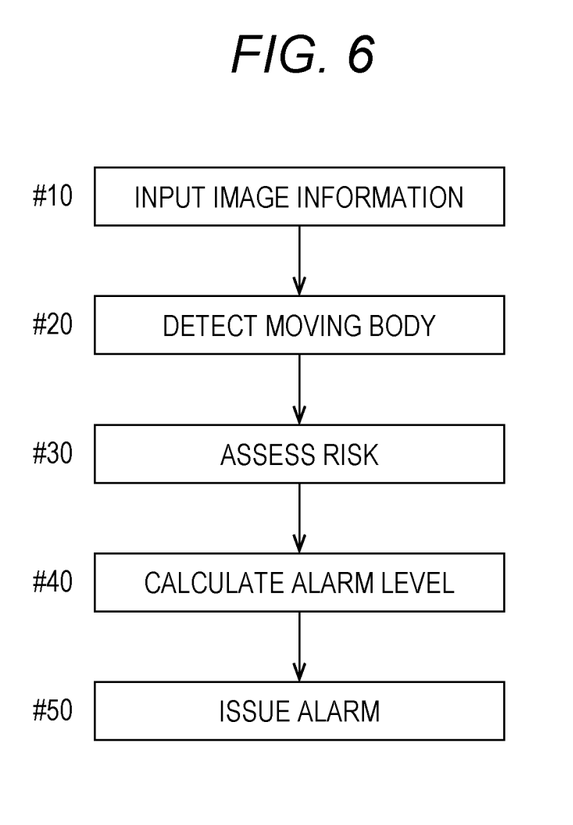
FIG. 6 is a flowchart illustrating an entire process according to the second embodiment.

The flowcharts of FIGS. 5 and 6 illustrate an outline of the entire processing steps performed by the moving body risk assessment devices 10A and 10B. When image information imaged in a wavelength region different from the visible region is input from the image information forming device 12 (#10), the moving body risk assessment devices 10A and 10B detect the moving body OB present in the image with the moving body detection unit 1 on the basis of the image information (#20), and then calculate a risk assessment value for the moving body OB as a result of the assessment performed by the risk assessment unit 2 (#30). In the moving body risk assessment device 10B (FIG. 6), an alarm level is further calculated by the alarm level calculation unit 3 from the risk assessment value (#40).

In the moving body risk assessment device 10B (FIG. 6), the alarm level calculated in step #40 is input to the output information generation unit 4 (FIG. 2), and output information based on the alarm level is output to the output device 14. The output device 14 issues an alarm corresponding to the alarm level on the basis of the output information from the output information generation unit 4 (#50). The output device 14 corresponds to a digital device that displays information associated with, for example, the gas leakage point Ip, makes notification regarding gas leakage, and the like when gas leakage occurs. Examples of the device include a control terminal device in a central monitoring room, a personal computer (stationary type, portable type, etc.), and a mobile terminal (smartphone, touch pad, etc.).

Next, detection of the moving direction and the moving speed of the moving body OB will be described with reference to the imaging screen Io in FIG. 7. The image information to be input to the moving body detection unit 1 includes two or more frames of the video data of the moving body OB captured by the imaging device 6, and the moving body detection unit 1 preferably detects the moving direction of the moving body OB using the video data. At this time, the moving body OB is detected by extracting pixels with changes using a plurality of frames equal to or more than two frames.

Figure 7A:
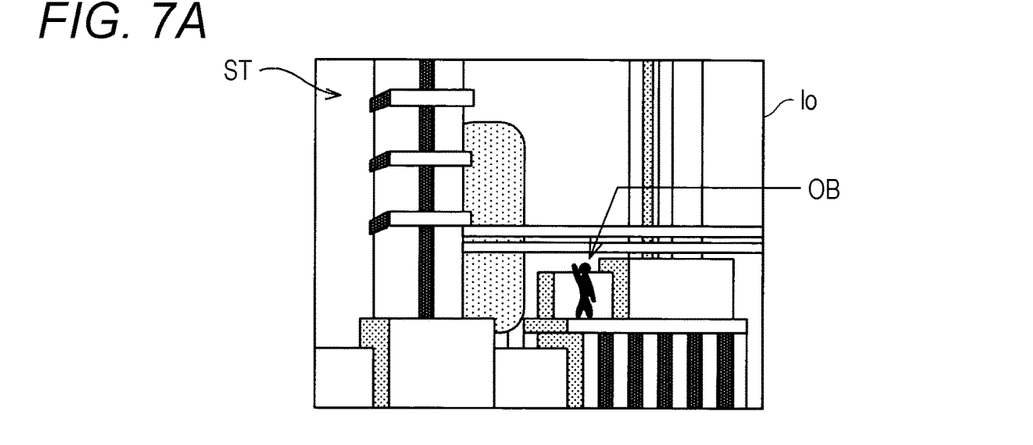
FIG. 7 is a schematic view illustrating an imaging screen for explaining a moving direction and a moving speed of a moving body.
Figure 7B:
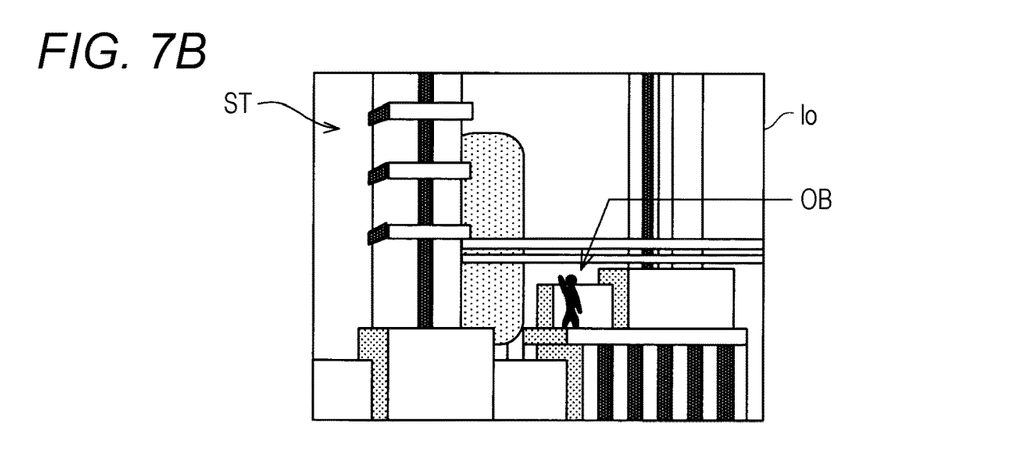
Figure 7C:
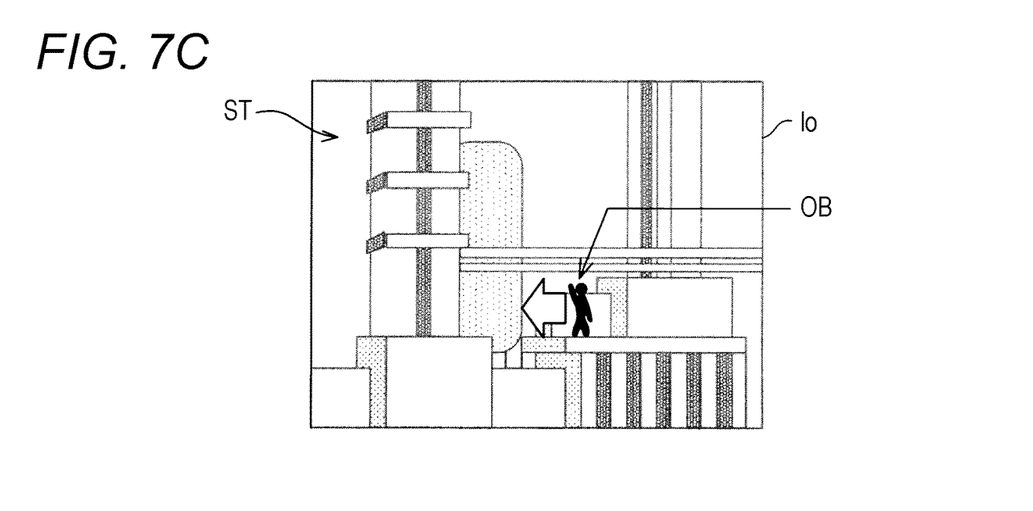

FIGS. 7A to 7C illustrate an exemplary method of detecting a moving body performed by the moving body detection unit 1 using two frames. The imaging screen Io in FIG. 7A is image information at time T0, and the imaging screen Io in FIG. 7B is image information at time T1 different from the time T0. By comparing those two, it is possible to detect a point having been changed in the image information, that is, the moving body OB, as illustrated in FIG. 7C. Information such as the moving direction and the moving speed of the detected moving body OB may be displayed on the imaging screen Io. For example, in FIG. 7C, the moving direction of the moving body OB is illustrated by the white arrow direction, and the moving speed of the moving body OB is illustrated by the size of the white arrow.

While FIGS. 7A and 7B illustrate an example using the two time points T0 and T1, the moving direction and the moving speed of the moving body OB can be detected by comparing images at a plurality of time points, not limited to two time points. In order for that, an optical flow method can be used, for example. The optical flow method is a method of estimating movement of each pixel between images at different time points from a change of a pixel value of each pixel, and the Lucas-Kanade method has been known as a representative method.

Figure 8:
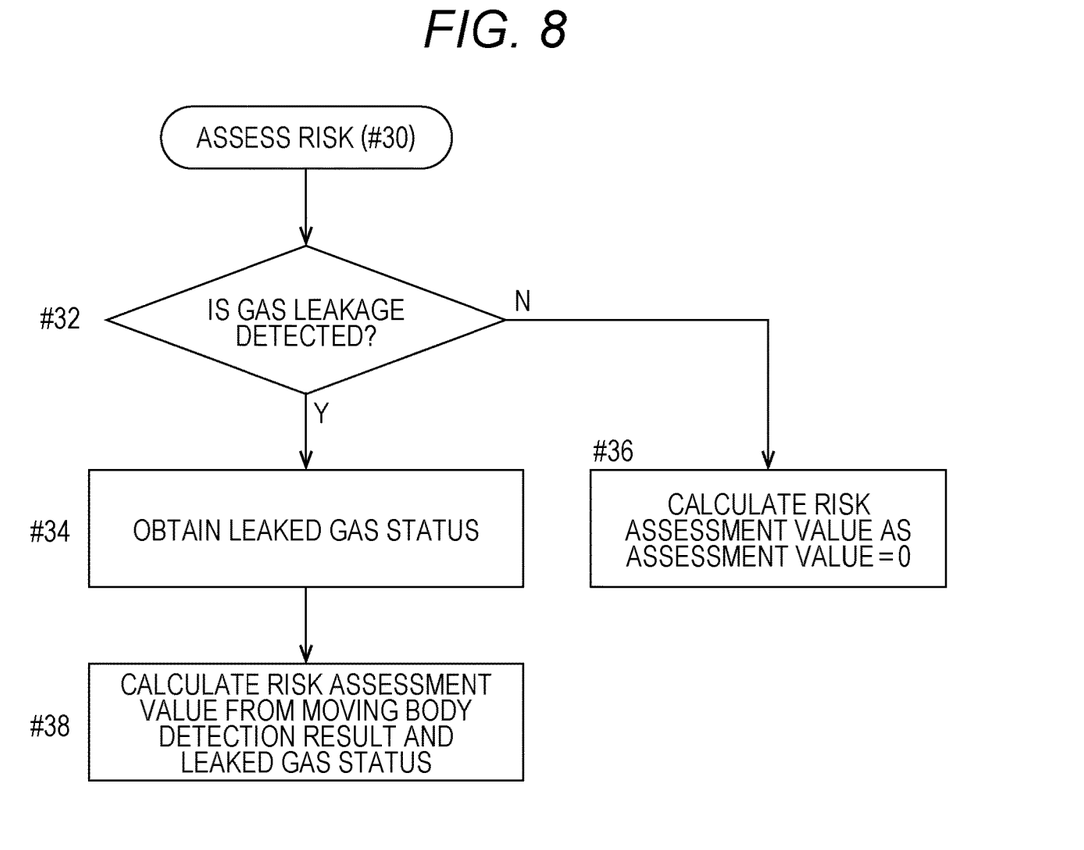
FIG. 8 is a flowchart illustrating an exemplary first process of processing of calculating a risk assessment value (#30 in FIGS. 5 and 6).
Figure 9:
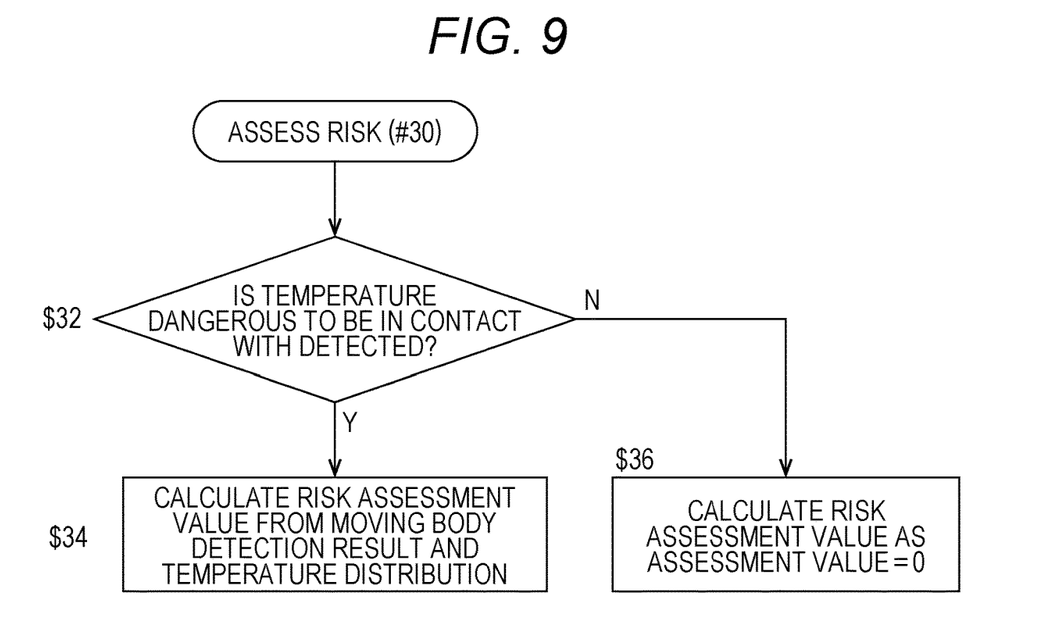
FIG. 9 is a flowchart illustrating an exemplary second process of the processing of calculating a risk assessment value (#30 in FIGS. 5 and 6).

The flowcharts of FIGS. 8 and 9 illustrate exemplary first and second processes of the processing of calculating a risk assessment value, respectively (#30 in FIGS. 5 and 6). The exemplary first process (FIG. 8) illustrates the processing of calculating a risk assessment value in the case where the image information input to the moving body risk assessment devices 10A and 10B is an image (gas distribution image) obtained by imaging the spatial distribution of the leaked gas GS. The exemplary second process (FIG. 9) illustrates the processing of calculating a risk assessment value in the case where the image information input to the moving body risk assessment devices 10A and 10B is an image (temperature distribution image) obtained by imaging temperature distribution.

In the exemplary first process (FIG. 8), it is determined whether or not gas leakage is present from the input image information (#32). When no gas leakage is detected in the determination in step #32, a risk assessment value is set to zero (#36). When gas leakage is detected in the determination in step #32, the leaked gas status is obtained (#34), and a risk assessment value for the moving body OB is calculated from the detection result of the moving body that has already been detected and the leaked gas status (#38). For example, the risk assessment value for the moving body OB is calculated on the basis of a relationship between a type of the gas GS present within the imaging range and a type of the leaked gas specified in advance, and the moving direction and the moving speed of the moving body OB detected by the moving body detection unit 1.

Examples of the leaked gas status include a gas leakage point, a type of the leaked gas, a scale of the leakage (total volume of the gas calculated from the gas image captured as an image, or a change in the total volume per unit time), and an advancing direction of the gas. The gas leakage point preferably includes not only a point at which the gas is actually leaking but also a point at which the gas is expected to be diffused when the moving body approaches. Since a lower explosion limit concentration (concentration at which explosion occurs if there is an ignition source when it becomes higher than the concentration) is obtained for each gas type, the risk assessment value is calculated by comparing the gas concentration obtained from the leakage scale with the lower explosion limit concentration, and further by considering whether the moving body is approaching the gas leakage point.

In the exemplary second process (FIG. 9), temperature distribution information is extracted from the input image information, and it is determined whether there is a point at a temperature that is dangerous if a person comes in contact ($32). When no point at a temperature that is dangerous if a person comes in contact is detected in the determination in step $32, the risk assessment value is set to zero ($36). When a point at a temperature that is dangerous if a person comes in contact is detected in the determination in step S32, a risk assessment value is calculated on the basis of the temperature distribution and the detection result of the moving body that has already been detected (S34).

Examples of a method of calculating a risk assessment value include:
- a calculation method in which it is determined whether the moving body OB is approaching or away from the dangerous point (gas in the case where the input image is an image obtained by imaging the spatial distribution of the leaked gas GS, and a point at a temperature that is dangerous to be in contact in the case where the input image is an image obtained by imaging the temperature distribution) on the basis of a movement vector of the moving body OB, and an assessment value is increased when the moving body OB is approaching;
- a calculation method in which, in the case where the input image is an image obtained by imaging the spatial distribution of the leaked gas GS, an assessment value is increased also in the case where the advancing direction of the leaked gas GS is approaching to the moving body OB; and
- a calculation method in which, in the case where the input image is an image obtained by imaging the spatial distribution of the leaked gas GS, a risk of explosion is calculated in consideration of the lower explosion limit from the scale of the gas leakage and the type of the leaked gas GS, and an assessment value is determined depending on the calculated value.

The alarm level is calculated (#40 in FIGS. 2 and 6) on the basis of the risk assessment value. In the case where the input image is an image obtained by imaging the spatial distribution of the leaked gas GS, correspondence relationships are determined in advance, such as the "highest level" for the risk assessment value corresponding to the case where personal damage is predicted (the scale of the leaked gas GS is large and the moving body OB is approaching the leaked gas GS, etc.), and an "attention level" for the risk assessment value corresponding to the case where it is predicted that personal damage will not occur immediately (it is far from the lower explosion limit although the leaked gas GS is detected, etc.). In the case where the input image is an image obtained by imaging the temperature distribution, correspondence relationships are determined in advance, such as the "highest level" for the risk assessment value corresponding to the case where urgency is high (the moving body OB is approaching to a point at which the temperature is extremely high or low at a high speed, etc.), and an "attention level" for the risk assessment value corresponding to the case where the speed of the moving body OB is low and the moving body OB is approaching slowly. Moreover, in the case where the moving body OB is slow, the moving body is a person so that the risk assessment value may be increased, and in the case where the moving body OB is at a high speed, the moving body is a vehicle so that the risk assessment value may be decreased. In addition, it may be distinguished whether the moving body OB is a person or a vehicle by a shape or a size of the moving body OB being analyzed from the image.

When an alarm is issued (#50 in FIGS. 2 and 6), an alarm corresponding to the calculated alarm level is issued. For example, a method of issuing an alarm all over the facility, a method of locally issuing an alarm in the vicinity of the gas leakage point, and the like can be conceived.

As can be understood from the descriptions above, the following characteristic configurations (C1) to (C10) and the like are included in the embodiments described above.

(C1): A moving body risk assessment device including:
a moving body detection unit that detects presence or movement of a moving body within an imaging range on the basis of image information imaged in a wavelength region different from a visible region; and
a risk assessment unit that assesses a risk to the detected moving body from the image information and a result of the moving body detection obtained by the moving body detection unit.

(C2): A moving body monitoring system including: an image information forming device that forms image information in a wavelength region different from a visible region and a moving body risk assessment device that assesses a risk to a moving body from the image information obtained by the image information forming device,
in which the moving body risk assessment device includes a moving body detection unit that detects presence or movement of the moving body within an imaging range on the basis of the image information, and a risk assessment unit that assesses a risk to the detected moving body from the image information and a result of the moving body detection obtained by the moving body detection unit.

(C3): A moving body risk assessment method including: inputting image information imaged in a wavelength region different from a visible region; detecting presence or movement of a moving body within an imaging range on the basis of the image information; and assessing a risk to the detected moving body from the image information and a result of the moving body detection obtained by the moving body detection unit.

(C4): A moving body risk assessment program causing a computer to perform: inputting image information imaged in a wavelength region different from a visible region; detecting presence or movement of a moving body within an imaging range on the basis of the image information; and assessing a risk to the detected moving body from the image information and a result of the moving body detection obtained by the moving body detection unit.

(C5): A configuration in which the image information in any one of the configurations (C1) to (C4) is image information imaged in an infrared wavelength region.

(C6): A configuration in which the image information in any one of the configurations (C1) to (C5) is image information obtained by imaging spatial distribution of gas present within the imaging range.

(C7): A configuration in which the risk assessment unit in the configuration (C6) assesses the risk to the moving body on the basis of a relationship between a type of the gas present within the imaging range and a type of leaked gas specified in advance.

(C8): A configuration in which the risk assessment unit in the configuration (C6) or (C7) assesses the risk to the moving body on the basis of a moving direction and a moving speed of the moving body detected by the moving body detection unit.

(C9): A configuration in which the image information in the configuration (C8) includes video data of the moving body of two or more frames captured by an imaging device, and the moving body detection unit detects the moving direction of the moving body using the video data.

(C10): A configuration according to the configuration (C2) in which the moving body risk assessment device further includes an alarm level calculation unit that calculates an alarm level from a result of assessment performed by the risk assessment unit, and the moving body monitoring system further includes an output device that issues an alarm corresponding to the alarm level.

As can be understood from the embodiments described above, according to an embodiment of the moving body risk assessment device, a moving body, such as a person present in an image, is detected on the basis of image information obtained by imaging invisible conditions dangerous to a human body, and a risk to the moving body is assessed, whereby the risk of the environment in which the moving body is present can be assessed. Therefore, personal damage can be reduced by taking measures based on the risk (e.g., providing appropriate evacuation guidance to workers and vehicles in the vicinity of the gas leakage point, etc.). The same applies to the case of using the moving body monitoring system, the moving body risk assessment method, or the moving body risk assessment program.

REFERENCE SIGNS LIST 1 moving body detection unit
2 risk assessment unit
3 alarm level calculation unit
4 output information generation unit
6 imaging device
7 image capturing unit
8 image processing unit
10A, 10B moving body risk assessment device
12 image information forming device
14 output device
20 moving body monitoring system
Ip gas leakage point
Io imaging screen
GS leaked gas
OB moving body
ST structure

The invention claimed is:

1. A moving body risk assessment device comprising a processor performing:
   an image reception in which image information imaged in a wavelength region different from a visible region is received;
   a moving body detection in which presence or movement of a moving body within an imaging range is detected on a basis of the image information; and
   a risk assessment in which a risk to the detected moving body is assessed on a basis of the image information and a result of the moving body detection, wherein the image information is image information obtained by imaging gas distribution present within the imaging range,
   wherein the processor performs the moving body detection in which a moving direction and a moving speed of the moving body are detected by comparing at least two of the image information imaged at different times, and
   wherein the processor performs the risk assessment in which the risk to the moving body is assessed on a basis of a relationship between a type of the gas present within the imaging range and a type of leaked gas specified in advance, and the moving direction and the moving speed of the moving body detected in the moving body detection.

2. The moving body risk assessment device according to claim 1, wherein
   the image information is image information imaged in an infrared wavelength region.

3. The moving body risk assessment device according to claim 2, wherein
   the image information includes video data of the moving body of two or more frames captured by an imaging device, and the processor performs the moving body detection in which the moving direction of the moving body is detected by using the video data.

4. A moving body monitoring system comprising:
   the moving body risk assessment device according to claim 3, further comprising an alarm level calculator that calculates an alarm level from a result of the risk assessment performed by the processor; and
   an output device that issues an alarm corresponding to the alarm level.

5. A moving body monitoring system comprising:
   the moving body risk assessment device according to claim 2, further comprising an alarm level calculator that calculates an alarm level from a result of the risk assessment performed by the processor; and
   an output device that issues an alarm corresponding to the alarm level.

6. A moving body monitoring system comprising:
   the moving body risk assessment device according to claim 1, further comprising an alarm level calculator that calculates an alarm level from a result of the risk assessment performed by the processor; and
   an output device that issues an alarm corresponding to the alarm level.

7. The moving body risk assessment device according to claim 1, wherein the processor performs the risk assessment in which whether or not gas leakage is present is determined on the basis of a gas distribution image.

8. The moving body risk assessment device according to claim 1, wherein the processor performs the risk assessment in which whether or not gas leakage is present is determined on the basis of a gas distribution image, a leaked gas status is obtained if it is determined that the gas leakage is present, and the risk to the detected moving body is assessed on a basis of the leaked gas status and the moving direction and the moving speed of the moving body detected in the moving body detection, the leaked gas status including the type of the gas present within the imaging range and the type of the leaked gas specified in advance.

9. A non-transitory computer-readable medium storing a moving body risk assessment processing program that, when executed by a processor, performs:
   an image reception in which image information imaged in a wavelength region different from a visible region is received;
   a moving body detection in which presence or movement of a moving body within an imaging range is detected on a basis of the image information; and
   a risk assessment in which a risk to the detected moving body is assessed on a basis of the image information and a result of the moving body detection, wherein the image information is image information obtained by imaging gas distribution present within the imaging range,
   wherein the moving body risk assessment processing program, when executed by the processor, performs the moving body detection in which a moving direction and a moving speed of the moving body are detected by comparing at least two of the image information imaged at different times, and
   wherein the moving body risk assessment processing program, when executed by the processor, performs the risk assessment in which the risk to the moving body is assessed on a basis of a relationship between a type of the gas present within the imaging range and a type of leaked gas specified in advance, and the moving direction and the moving speed of the moving body detected in the moving body detection.

10. The non-transitory computer-readable medium according to claim 9, wherein the moving body risk assessment processing program, when executed by the processor, performs the risk assessment in which whether or not gas leakage is present is determined on the basis of a gas distribution image.

11. The non-transitory computer-readable medium according to claim 9, wherein the moving body risk assessment processing program, when executed by the processor, performs the risk assessment in which whether or not gas leakage is present is determined on the basis of a gas distribution image, a leaked gas status is obtained if it is determined that the gas leakage is present, and the risk to the detected moving body is assessed on a basis of the leaked gas status and the moving direction and the moving speed of the moving body detected in the moving body detection, the leaked gas status including the type of the gas present within the imaging range and the type of the leaked gas specified in advance.

\* \* \* \* \*